March 4, 1958 R. C. DENNISON ET AL 2,825,757

TELEVISION SPECIAL EFFECTS CIRCUITS

Filed July 1, 1955 3 Sheets-Sheet 1

INVENTORS
ROBERT C. DENNISON
BY & ARCH C. LUTHER, JR.
[signature]
ATTORNEY

INVENTORS
ROBERT C. DENNISON
& ARCH C. LUTHER, JR.
BY
[signature]
ATTORNEY

March 4, 1958 R. C. DENNISON ET AL 2,825,757

TELEVISION SPECIAL EFFECTS CIRCUITS

Filed July 1, 1955 3 Sheets-Sheet 3

INVENTORS
ROBERT C. DENNISON
& ARCH C. LUTHER, JR.
BY
ATTORNEY

United States Patent Office 2,825,757

Patented Mar. 4, 1958

2,825,757

TELEVISION SPECIAL EFFECTS CIRCUITS

Robert C. Dennison, Westmont, and Arch C. Luther, Jr., Merchantville, N. J., assignors to Radio Corporation of America, a corporation of Delaware Application July 1, 1955, Serial No. 519,502

2 Claims. (Cl. 178—7.3)

Figure 1:
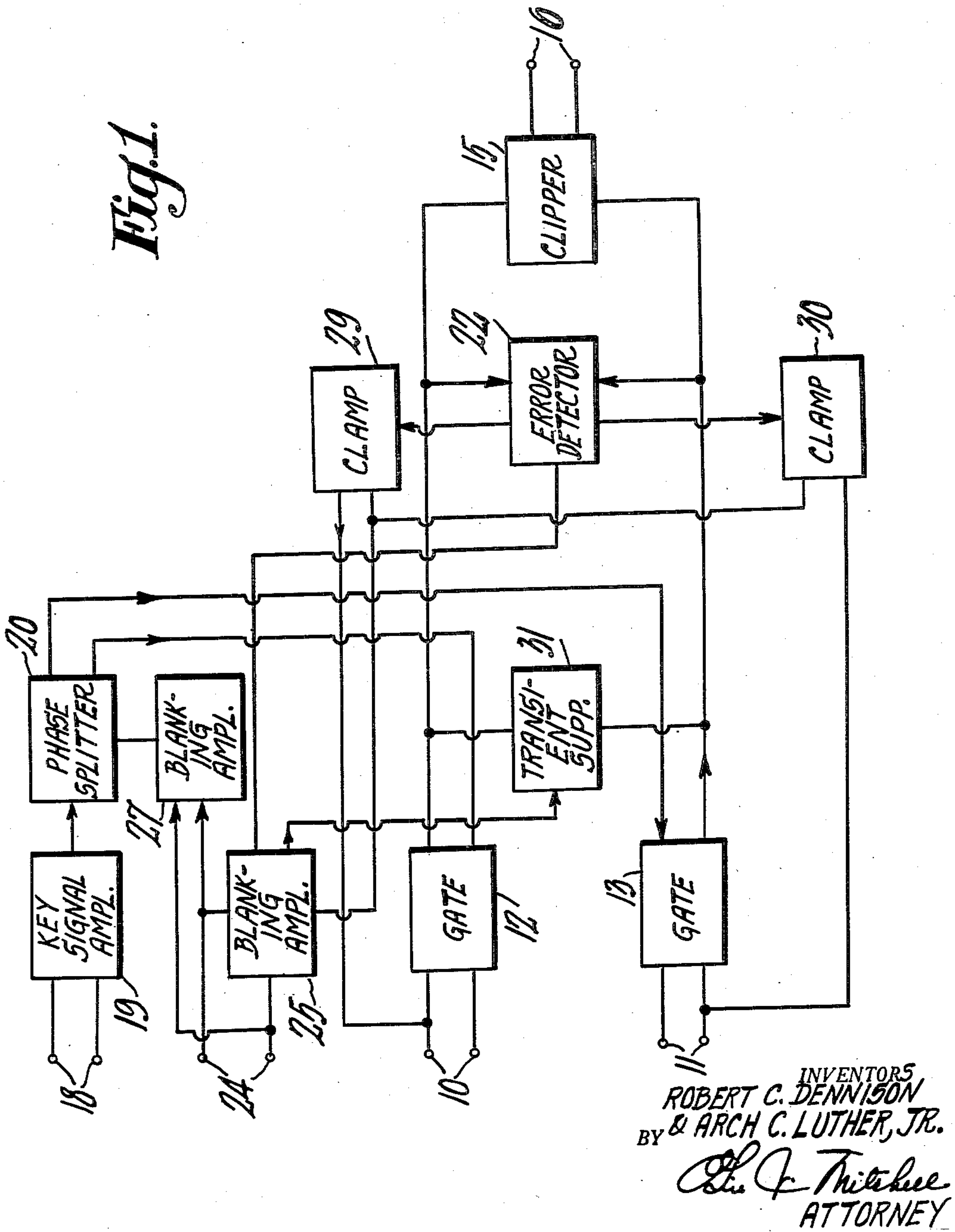

The present invention relates generally to improved circuits for combining signal information from a plurality of signal sources to provide a composite signal and particularly to an improved circuit wherein variations in the signal information in each channel may be maintained at a stable reference level.

In a transmitted television signal, the voltage difference between true-black and reference-black must remain constant for all areas of a particular picture as well as for successive pictures which may have different average brightnesses. If this difference remains constant, it is possible to recover the black level at any point in the circuit by forcing all blanking pulses to hold the same level. The process of bringing all of the blanking pulses to the same reference level is commonly referred to as clamping. Negative feedback clamping provides stable operation over a wide range of signal variations and is effective to stabilize circuit operation against variations in circuit components and supply voltage changes.

Special effects in television broadcasting have led to a wide spread demand for improved and more stable special effects amplifier circuits. In such equipment, two video signals are montaged into one composite scene and any difference in the black level of either picture is readily apparent. Under static picture conditions, the drift in black level may occur due to supply voltage fluctuation but it is usually most objectionable when it is a function of the size, shape and/or position of the keying signal. Negative feedback clamping may be used to alleviate the shift in black level in amplifiers.

Gate tubes are frequently utilized to control the signal information in each of the channels and are alternately turned on or off to provide single channel signal translation at any given instant. This switching would normally cause large anode voltage excursions which result in spikes being sent through the anode-cathode capacitance of the following tube which in such circuits is normally called the clipper tube. In single channel operation, the excessive anode voltage excursions may be prevented by means of diode suppressor circuits. This technique, however, can not be effectively used in a multi-channel arrangement without certain modifications because the effect of the diode suppressor on the feedback clamping circuit is undesirable.

Is is accordingly an object of the present invention to provide an improved circuit for combining video signal information from a plurality of signal sources wherein the signal information in each channel may be maintained at a predetermined stable reference level.

It is a further object of the present invention to provide an improved special effects amplifier circuit for combining signal information received from two or more signal sources to provide a composite signal while maintaining a predetermined fixed black level for each of the signals and avoiding the deleterious effect produced by the alternate switching of the signal sources.

In special effects signal amplifier circuits utilized to combine the signal information from two or more signal sources, it is generally necessary to switch the common channel in which these signals are combined to each of the signal sources in an alternate or time sharing manner. This switching action, of course, aggravates the problem of attempting to maintain a fixed reference level for each signal which is to be combined. However, since the clamping action is accomplished during the blanking interval, it is possible to provide a common clamping action for all channels if all channels are connected simultaneously to the common channel during the blanking interval.

It is accordingly a still further object of the present invention to provide an improved special effects amplifier circuit for combining video signal information from a plurality of signal sources in order to provide a composite signal and wherein all signal sources are simultaneously connected with the common mixing channel during the blanking or clamping interval.

In accordance with one aspect of the present invention, signal information from at least two signal sources, in which the blanking pulses of each signal are in synchronism, or in time-locked relation to one another, is applied to a common channel by means of electron discharge devices utilized as electronically controlled gates. The black levels of the video signals translated by the gating devices are maintained at a common reference level by means of individual negative feedback clamps and error detectors referenced to a common D.-C. potential.

The suppression of transient signals produced by the switching action is accomplished in each of the channels by means of a unilaterally conducting device which is effective in suppressing transient excursions beyond a predetermined level. However, in accordance with the present invention, the effect of the unilaterally conducting device on the operation of the negative feedback clamp is avoided by electronically rendering the unilaterally conducting device inoperative during the blanking and clamping interval.

In accordance with a further aspect of the present invention, the alternate operation of the electronic gates is under the control of signal information received from a phase splitter having a common impedance comprising an electronically controllable impedance element. The electronically controllable impedance element is operative in accordance with the present invention to provide a substantially open circuit during the blanking interval thereby establishing a signal condition in the phase splitter circuit such as to render the electronic gate in each of the signal channels operative. In this manner, all channels may be simultaneously adjusted to a desired reference black level.

Figure 2A:
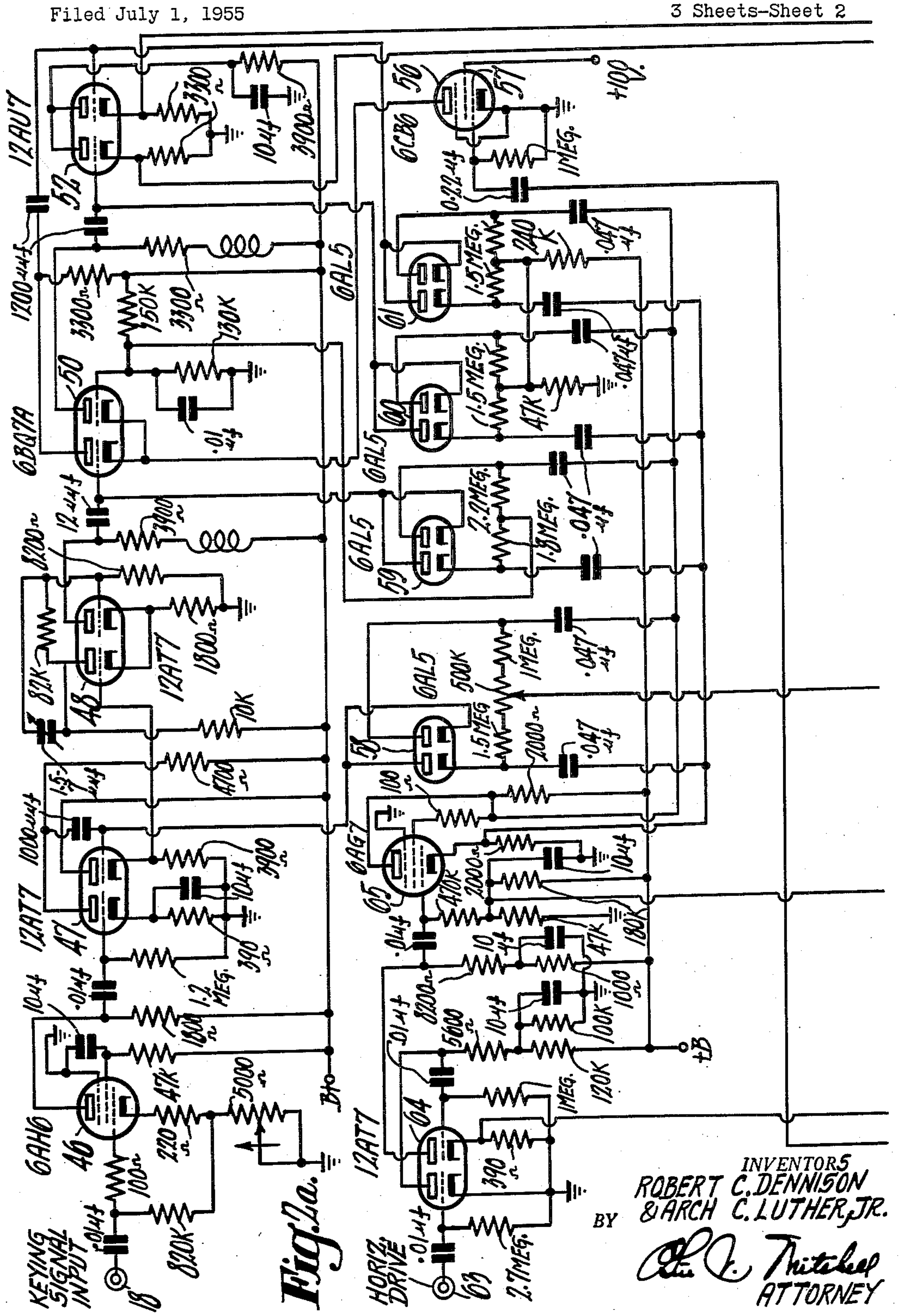
Figure 2B:
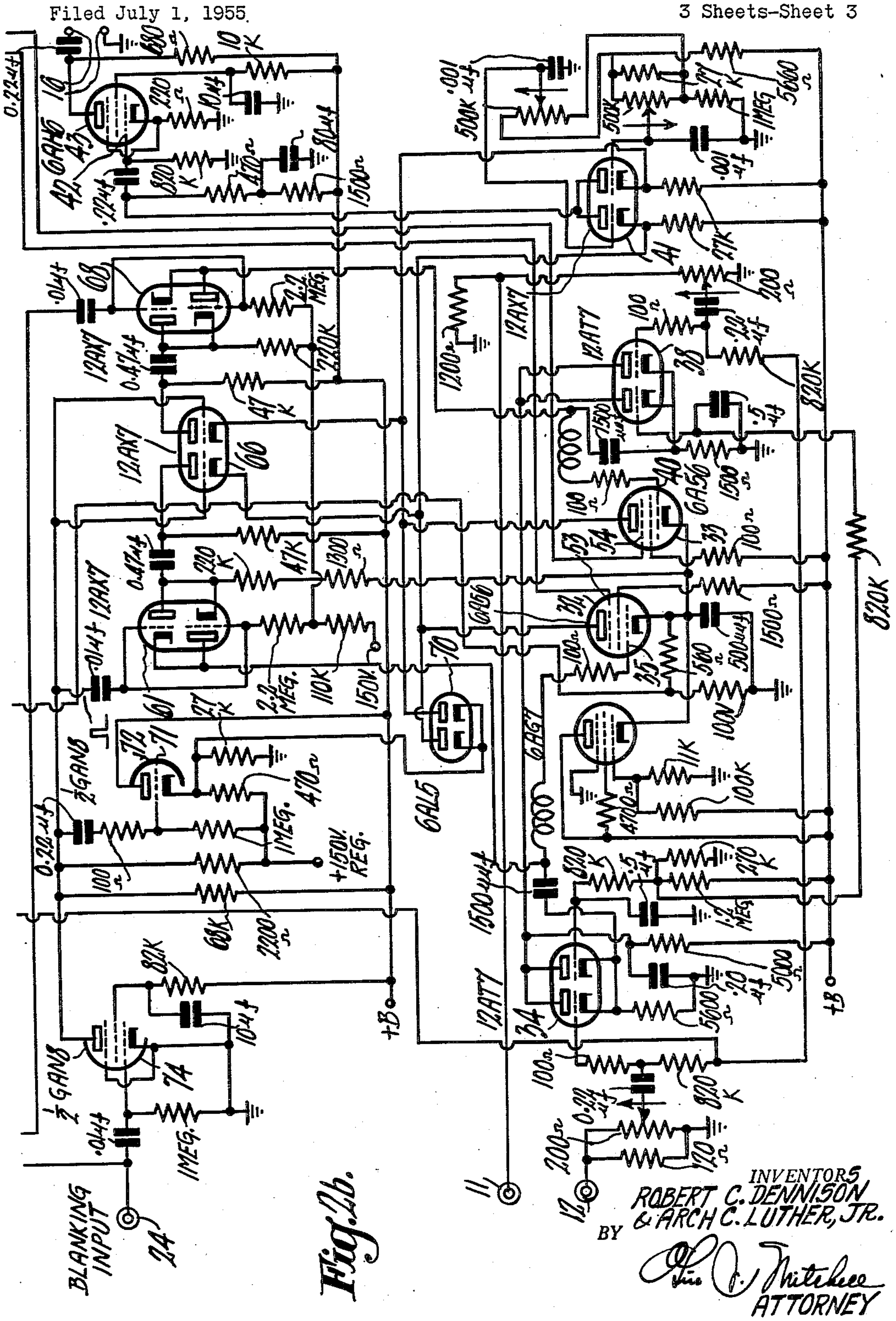

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings, in which:

Figure 1 is a block diagram illustrating generally a special effects amplifier provided in accordance with the present invention; and Figure 2 is a schematic circuit diagram of a special effects amplifier incorporating control circuits as provided by the present invention.

The input terminals 10 and 11 of the gates 12 and 13 are respectively adapted to receive signal information from separate signal sources such as an appropriate television camera pickup device. The output signals which may be derived from each of the gates 12 and 13 are applied to a clipper 15 wherein they are combined to provide at the output terminals 16 a composite video signal.

The operation of the gates 12 and 13 is controlled by means of a keying pulse which may be applied to the input terminals 18 from any convenient source which supplies a pulse at the horizontal line frequency of 15,750 C. P. S. The keying pulse is amplified in a keying signal amplifier circuit 19 and applied to a phase splitter 20 in order to develop a pair of signals of opposite polarity to control the gates 12 and 13 alternately or on a time sharing basis.

An error detector 22 is connected in common with the output circuits of the gates 12 and 13 as the first controllable element in the feedback loop around each of the gates which is effective to adjust the direct current level of the video signal information in each of the input channels to a predetermined reference level.

Blanking pulses are applied to the input terminals 24 and amplified by a blanking amplifier 25 to control the duty cycle of the error detector such that the error detector 22 is effective to alter the direct current level of each of the input channels only during the blanking interval. The blanking signal which is also at the horizontal line frequency is simultaneously applied to a second blanking amplifier 27 utilized as a common cathode impedance for the phase splitter 20. The operation of the blanking amplifier 27 and its effect on the phase splitter 20 will be discussed more fully hereinafter.

An output signal which may be derived from the error detector 22 at such times that the black level of the input signals is erroneous is applied to a first clamp circuit 29 connected between the error detector 22 and one of the pair of the input terminals 10, and if the second video signal also contains an erroneous black level, an error signal will simultaneously be applied to the second clamp 30 connected between the error detector 22 and one of the pair of the input terminals 11.

The feedback clamping action of the error detector 22 and the clamps 29 and 30 is such as to adjust the direct current level of each of the video signals to the predetermined reference black level during the clamping interval. Each of the clamp circuits is operative only during the blanking interval and maintains the predetermined reference during the subsequent line interval and until the subsequent blanking interval, when adjustment is again made for any further error which might have developed.

The operation of the gates 12 and 13 is such as to provide a transient signal in their respective output circuits which, if applied to the clipper 15, might result in a spurious video signal. In order to avoid this deleterious effect, a transient suppressor 31 is connected with the output circuits of the gates 12 and 13 and is operative to prevent extreme transient excursions in the signal level appearing in these output circuits.

However, since the transient suppressor 13 is effectively in shunt with a portion of the feedback loops connected between the respective output and input circuits of each of the gates 12 and 13, it is desirable to render the transient suppressor inoperative during the blanking interval when the feedback clamping circuits are affected to adjust the black level of each of the video signals. This is accomplished in accordance with the present invention by applying a blanking pulse from the blanking amplifier 25 to the transient suppressor 31 in such a manner as to render the transient suppressor 31 inoperative during the blanking interval. Since the transient suppressor 31 is inoperative during the blanking interval, the clamping action provided by the negative feedback clamping circuits may operate without interference from the transient suppressor 31.

In view of the fact that the negative feedback clamping circuits must be operative during the blanking interval in order to effectively adjust the black level of each of the video signals, it is necessary to provide a keying pulse for each of the gates 12 and 13 which renders these circuits conductive during the blanking interval. This is accomplished, in accordance with the present invention, by means of the operation of the blanking amplifier 27 hereinbefore mentioned.

During normal signal handling conditions, the output signals from the phase splitter 20, which are applied to the gates circuit 12 and 13, are of opposite polarity in order to provide the time sharing or switching action. During the blanking interval, however, the common cathode impedance for the phase splitter 20, which is provided by the blanking amplifier 27, is electronically controlled under the action of the blanking pulses to provide substantially an open circuit. The effect of this extremely high impedance on the phase splitter 20 is such as to provide a pair of output signals of the same polarity during the interval when this high impedance appertains, which, is during the blanking interval. These signals which are of the same polarity are, accordingly, applied during the blanking interval to the gates 12 and 13 to render each of these gates conductive, thereby permitting simultaneous operation of each of the negative feedback clamp circuits to simultaneously adjust the black level of each of the video signals to a predetermined reference level.

It is apparent therefore that in accordance with the present invention, means are provided for rendering a plurality of signal translating channels conductive during a clamping interval whereby the black level in each of the individual channels may be simultaneously adjusted by means of a negative feedback clamp circuit providing stable and reliable operation. Also, in accordance with the present invention, means are provided for transient suppression without adversely affecting the feedback loop gain.

The schematic circuit diagram illustrated in Figure 2 shows one form of a practical special effects amplifier circuit incorporating circuits in accordance with the various aspects of the invention as above discussed. The electron discharge devices 32 and 33 respectively represents the gates 12 and 13 of Figure 1. Accordingly, signal information may be applied from any convenient source to the input terminal 10 which is connected to the input circuit of a gain control amplifier 34 utilized to amplify the video signal information and adjust the gain of that particular video signal channel. The output circuit in the gain control amplifier 34 is coupled with the control electrode 35 of the electron discharge device 32 which, as above mentioned, is utilized as one of the gates. Signal information may be simultaneously applied to the second input terminal 11 to be amplified by a second gain control amplifier 38 and applied to the control electrode 40 of the second gate.

The output signals from each of the two gate tubes 32 and 33 are applied to the respective control electrodes of the clipper tube 41 wherein they are combined to provide a single composite signal which is applied to the control electrode 42 of a picture amplifier tube 43. Accordingly, an amplified composite signal may be derived from the output terminals 16 which are connected in the anode circuit of the picture amplifier tube 43.

The operation of the gates 32 and 33 are under the control of a keying signal which is applied to the system at the input terminal 18. This signal is amplified in a pair of keying signal amplifiers 46 and 47 and applied to a regenerative clipper 48 in order to adjust the amplitude and shape of the keying signal pulses. The keying signal pulses thus formed are applied to a phase splitter 50 for providing a pair of keying signals of opposite polarity.

Output signals from the phase splitter 50 are applied through cathode follower circuits 52 to the suppressor grids 53 and 54 of the gates 32 and 33 in order to render these gates alternately conductive for the translation of signal information applied to the input terminals 10 and 11.

It may be noted, at this time, that the common cathode load for the phase splitter 50 comprises an electron discharge device 56 which presents an effective load depending on the signal applied to the control grid 57. During such times that it is necessary to provide alternate operation of the gates 32 and 33, the electron discharge device 56 is adapted to provide an impedance which enables the phase splitter 50 to operate in a normal manner to provide in its output circuits the previously mentioned pair of signals of opposite polarity. The further purpose of the electron discharge device 56 will be discussed more fully hereinafter in connection with the black level adjustment of the two signal channels.

It may be further noted, at this time, that the operational aspects of each of the keying signal amplifier 47, the phase splitter 50 and the cathode follower circuits 52 are under the control of the clamp circuits 58, 59, 60 and 61 respectively. The details of these clamp circuits may be found in United States Patent 2,299,945, issued November 27, 1940, to K. H. Wendt for Direct Current Reinsertion Circuit.

The keying signal for the control of the D.-C. clamp circuits may be applied to an input terminal 63 to be amplified by a horizontal drive amplifier 64 and applied to a clamp keyer circuit 65. The output signals from the clamp keyer circuit 65 are applied to the D.-C. clamps 58, 59, 60 and 61 in a manner described in the above-identified patent.

It may be seen that insofar as the system shown in Figure 2 has been discussed and described there is provided the necessary apparatus for mixing a pair of video signals which may be applied to the input terminals 10 and 11 so as to provide a composite signal available at the output terminals 16. This mixing is accomplished by the alternate operation of the gates 32 and 33 in order to alternately apply the video signals to the clipper 41. However, the adjustment of the black level of each of the video signals must be accomplished during the blanking period. This requires that each of the gates 32 and 33 be rendered conductive during the blanking interval.

Accordingly, a blanking signal which may be applied from any convenient source to the input terminal 24 is applied to the control grid 57 of the electron discharge device 56 in order to render this device non-conductive during the blanking interval. The effect of rendering the electron discharge device 56 non conductive during the blanking interval is such as to establish a high impedance condition in the cathode circuit of the phase splitter 50. This high impedance results in a pair of signals in the output circuit of the phase splitter, which are, during this period, of the same polarity. The circuit operation is such as to provide the correct polarity such that both of the gates 32 and 33 are rendered conductive during the blanking interval thereby enabling simultaneous correction for black level as necessary.

The actual adjustment or correction of the error in the black level of the applied video signals is accomplished under the control of an error detector circuit 66 which is connected in common with the output circuits of the gates 32 and 33.

A blanking pulse is applied from the input terminal 24 to the control grids of the error detector 66 in order to render this device conductive during the blanking interval. The operation of the error detector 66 during the blanking interval is such as to apply an error signal, if such error exists, to one or both of a pair of triode clamp circuits 67 and 68 which are connected respectively between the output circuits of the error detector and the input circuits of the gate circuits 32 and 33.

A keying signal is applied simultaneously to the control grids of the clamp circuits 67 and 68 from the horizontal drive amplifier 64 to render these clamps effective during the blanking interval in order to adjust the black level at the input of each of the gates 32 and 33.

After the video signal has been clamped, as above described, it must be clipped at a level slightly below the true-black level. It is a requirement that the cut-off of the clipper should be extremely sharp. There should be no non linear distortion of the video signal in the region right above the clamping level.

When the load on the gates 32 and 33 changes rapidly due to the rapid cut-off action of the clipper 41, the signal at the anode of the gates 32 and 33 becomes greatly amplified as compared to the level when the clipper is conductive. Thus, as the clipper is operating to cut off the picture at black level, the signal below black level will appear greatly amplified in the anode of the gates 32 and 33. This phenomenon is known as the impedance switching principle. The effect of this impedance switching represents a serious disadvantage in that a large back swing, after cut-off of the clipper, tends to be coupled through the stray capacity associated with the clipper stage thus giving rise ot spikes on the clipped waveform.

For this reason, a transient suppressor 70 is connected between the anodes of the gates 32 and 33 and a source of reference voltage as determined by the voltage available at the cathode 71 of the cathode follower stage 72. The operation of the transient suppressor is such as to prevent the extreme excursions of the voltage developed at the anodes of the gates 32 and 33 due to impedance switching. The effect of the transient suppressor 70, however, if allowed to remain operative during the blanking interval would be such as to drastically reduce the gain of the negative feedback clamp loops. Accordingly, the transient suppressor 70 is rendered inoperative during the blanking interval.

This is accomplished under the control of a blanking pulse amplified by the blanking pulse amplifier 74 and applied to the cathode follower 72 which establishes, during the blanking interval, a voltage at the cathode 71 substantially above that of the anodes of the gate tubes 32 and 33.

It is seen therefore, that during the blanking interval, the transient suppressor 70 is biased in such a manner that it cannot be rendered conductive and therefore cannot provide an impedance which would be deleterious to the operation of the negative feedback clamp circuits. The means provided in accordance with the present invention are therefore operative to enable reliable and stable operation under a variety of circuit conditions. The black level of the various video signals translated by the system provided in accordance with the present invention may be individually adjusted to a desired level and are maintained at a constant predetermined level during operation regardless of the direct current components of the applied video signal. Means are provided for simultaneously adjusting the black level in each of the signal translating channels and for suppressing transient signals in the circuit without adversely effecting the black level adjustment.

Having thus described the present invention, what is claimed is:

1. Television picture signal translating apparatus for combining signal information from a plurality of television signal sources to provide a composite signal comprising, a plurality of signal gate circuits each adapted to receive signal information from a respective one of said signal sources, said signal information including regularly recurring television blanking intervals the amplitude value of said signal information during said blanking interval representing black picture level, means coupled in common with said signal gate circuits for combining the output signals of said gate circuits into a composite signal, negative feedback clamp means coupled between the output circuit and input circuit of each of said gate circuits for adjusting said amplitude value corresponding to black picture level of each of said plurality of signals to a predetermined voltage, keying means operatively coupled to said clamp means and said gate circuits for rendering said gate circuits sequentially conductive, said keying means including an electron discharge device utilized as a controllable impedance element, means adapted to render said electron discharge device non-conductive during said blanking interval for affecting said keying means such that said gate circuits are rendered simultaneously conductive during periodic intervals corresponding in time to said blanking intervals, transient suppressor means coupled between the output circuit of each of said gate circuits and a source of controllable reference potential, and pulse means coupled with said source of controllable reference potential for increasing said reference potential during said periodic intervals whereby said transient suppression means is rendered inoperative during said periodic intervals.

2. Television apparatus for producing a composite picture signal from two separate picture signals and providing for adjustment of the black level of both picture signals to a common reference potential comprising, two sources of television picture signals, time locked with respect to one another, each of said picture signals having periodically recurring blanking intervals, the amplitude of said signals substantially corresponding to black picture level during said blanking intervals and corresponding to the brightness information along successive television picture lines during the line scanning intervals between said blanking intervals, a keying signal producing means productive of a train of keying pulses timed to occur during said blanking intervals, a separate signal-gating means operatively coupled to each of said picture signal sources for selectively gating on and gating off the passage of said picture signals therethrough in response to keying signals produced by said keying signal producing means, said keying signal producing means operatively coupled to both of said signal-gating means and adapted to produce keying signals which produce in said signal-gating means a periodically recurring gating sequence, said sequence comprising the simultaneous gating-on of both gating means during said blanking intervals and the alternate gating-on of said gating means in timed relation to successive line scanning intervals to provide alternate passage of brightness information by said gating means such that the brightness information of successive scanned lines is alternately passed by said respective gating means while black picture level information depicted during successive blanking intervals are simultaneously passed by both gating means, a source of predetermined reference potential, clamping means responsive to said keying signals operatively connected to said gating means and said source of reference potential, said clamping means being operatively coupled to said source of keying signals to effect clamping of the black-level amplitude of both of said picture signals to said predetermined reference potential during each successive blanking interval in said picture signals, combining means coupled to each gating means for combining said two clamped picture signals after passing through said gating means thereby to produce a composite picture signal.

References Cited in the file of this patent

UNITED STATES PATENTS

| | | |
|---|---|---|
| 2,233,317 | Konkle | Feb. 25, 1941 |
| 2,324,314 | Michel | July 13, 1943 |
| 2,464,353 | Smith et al. | Mar. 15, 1949 |
| 2,636,080 | Doba | Apr. 23, 1953 |